United States Patent [19]

Coran et al.

[11] 4,323,625

[45] Apr. 6, 1982

[54] COMPOSITES OF GRAFTED OLEFIN POLYMERS AND CELLULOSE FIBERS

[75] Inventors: Aubert Y. Coran; Raman Patel, both of Akron, Ohio

[73] Assignee: Monsanto Company, St. Louis, Mo.

[21] Appl. No.: 159,078

[22] Filed: Jun. 13, 1980

[51] Int. Cl.³ .................. B32B 23/00; C08L 61/10
[52] U.S. Cl. .................................. 428/361; 428/378; 428/393; 428/507; 428/526; 524/14; 524/504
[58] Field of Search ............... 428/393, 361, 375, 378, 428/400, 526, 507; 260/17.4 CL, 42.14, 42.57; 8/116 R

[56] References Cited

U.S. PATENT DOCUMENTS

| | | | |
|---|---|---|---|
| 3,211,804 | 10/1965 | Baum et al. | 8/DIG. 9 |
| 3,697,364 | 10/1972 | Boustany et al. | 428/266 |
| 3,909,463 | 9/1975 | Hartman | 260/38 |
| 3,943,079 | 3/1976 | Hamed | 260/17.4 CL |

FOREIGN PATENT DOCUMENTS 55-50041  4/1980  Japan .

*Primary Examiner*—Michael W. Ball
*Attorney, Agent, or Firm*—Gordon B. Seward

[57] ABSTRACT

Composites are disclosed of discontinuous cellulose fibers mixed with a methylol phenolic modified polyolefin and a bonding agent. Treated fibers are also disclosed, which are treated to reduce fiber-to-fiber interaction so as to facilitate mixing into composites.

26 Claims, No Drawings

COMPOSITES OF GRAFTED OLEFIN POLYMERS AND CELLULOSE FIBERS

BACKGROUND OF THE INVENTION

This invention relates to composites of cellulose fibers and grafted polymers from olefins, and to cellulose fibers treated with such polymers.

It is known that the mixture of discontinuous fibers with polymeric materials can impart improved properties to the polymeric materials, such as greater strength and stiffness. For example, glass fibers incorporated into a polypropylene molding resin can produce a rigid, strong composite, suitable for a variety of applications. The combination of discontinuous cellulosic fibers with a variety of vulcanized elastomers is described in U.S. Pat. No. 3,697,364 to Boustany and Coran. Also, U.S. Pat. No. 3,943,079 to Hamed shows pretreatment of cellulosic fibers prior to incorporating them into a variety of organic polymers.

SUMMARY OF THE INVENTION

It has now been discovered that a composite formed by mixing discontinuous cellulose fibers with a grafted monoolefin polymer has particularly useful properties. More specially, the novel composites consist essentially of from 2 to 55 weight percent of discontinuous cellulose fibers, the remaining 98 to 45 weight percent being a matrix comprising from 2 to 99.9 parts by weight of a methylol phenolic-modified crystalline polymer from alpha olefin monomer having 2 to 4 carbon atoms, and at least 0.1 part by weight of a bonding agent per 100 parts matrix by weight.

It has also been found that treated fibers, comprising discontinuous cellulose fibers of aspect ratio greater than five, and methylol phenolic-modified crystalline polymer from alpha olefin monomer having 2–4 carbon atoms, said modified crystalline polymer being present in an amount sufficient to reduce fiber-to-fiber interaction up to about 85 parts by weight per 100 parts of fibers by weight, have useful properties.

Advantageously, the fibers contained in the composites of the invention can be oriented to a greater or lesser degree, providing products having a greater strength and stiffness in the direction of orientation. Random fiber orientation, however, may be produced if isotropic composites are desired, having the same degree of strength and stiffness in all directions.

The discontinuous cellulose fibers employed in the composites and treated fibers of the invention include regenerated cellulose, such as rayon fibers, or any of a variety of unregenerated fibers, many of which are found in nature. Seed fibers such as cotton, woody fibers from coniferous or deciduous woods, bast fibers such as flax, and leaf or fruit fibers such as sisal or coconut can be used. Preferred are wood fibers, and especially hardwood kraft, i.e., wood pulp made by the sulfite process.

The average aspect ratio of the cellulose fibers strongly affects the modulus obtainable in the composites of the invention. The average aspect ratio is the ratio of average length to average diameter of the fibers, and is preferably greater than five in the fibers of the invention. More preferred fibers have average aspect ratios from 20 to 200, with average aspect ratios of from 50 to 200, or 75 to 200 being most preferred. Since some fiber breakage may result in the step of mixing the fibers into the matrix, the initial average aspect ratio can be greater than 200, but the best results are obtained with final average aspect ratios of 200 or less. Mixtures of fibers having different average aspect ratios can be usefully employed.

Hardwood fiber, because of its smaller diameter as compared with softwood fiber, is preferred, since a shorter fiber can be used within the preferred aspect ratio. Smaller diameter fibers are more flexible, and shorter fibers are less likely to break during mixing.

The fibers can be pretreated before incorporation into the composites to reduce fiber-to-fiber interaction, and the methods of Hamed as taught in U.S. Pat. No. 3,943,079 can be employed for this purpose, the disclosure of U.S. Pat. No. 3,943,079 being herein incorporated by reference. Pretreatment is effective in reducing the time and work required to incorporate the fibers into the matrix, thus reducing the amount of fiber breakage thereby. Pretreatment methods can also be used other than that in the Hamed patent, such as by slurrying the fibers in water with a polymer latex or with a particulate filler material such as carbon black, talc, or fine particle size calcium carbonate.

If it is desired to incorporate the fibers into the matrix without the use of the pretreatment steps set forth above, a portion of the modified polyolefin can be admixed in solution in a hydrocarbon solvent, which solvent is driven off in the mixer. If a matrix containing another polymer is to be employed, a polymer can be selected which is molten at the mixing temperatures employed, and which acts to coat the fibers and prevent fiber-to-fiber interaction. Addition of water to the fibers prior to mixing is helpful to plasticize and separate the fibers somewhat, to reduce the degree of fiber breakage.

The composites of the invention comprise discontinuous cellulose fibers mixed with certain modified crystalline olefin polymers. These modified polymers, which have methylol phenolic groups grafted thereto, may be prepared by the reaction of crystalline monoolefin polymer with methylol phenolic material in the presence of activator. It is believed that the activator promotes graft formation in which the methylol phenolic material is linked through a methylene bridge to the crystalline olefin polymer. The resulting modified polymer has methylol phenolic groups grafted thereto. Some of the methylol phenolic groups may be pendant to the olefin polymer chain, being attached by a single link, while other methylol phenolic groups may form links between two olefin polymer molecules.

Preparation of the modified crystalline alpha-olefin polymers of the invention is described in our co-pending U.S. patent application Ser. No. 109,728, filed Jan. 4, 1980, and issued July 14, 1981, as U.S. Pat. No. 4,278,572, the disclosure of which is hereby incorporated by reference.

Suitable olefin polymers for modification comprise crystalline homopolymers or copolymers of $C_2$–$C_4$ alpha monoolefins (alkenes). An important subgroup of satisfactory olefin polymers comprises crystalline, high molecular weight solid products from the polymerization of one or more monoolefins by either high pressure or low pressure processes. Examples of such polymers are the isotactic or syndiotactic monoolefin polymers, representative members of which are commercially available. Examples of satisfactory olefin monomers are ethylene, propylene, 1-butene, 2-methyl-1-propene, and mixtures thereof. Commercially available thermoplastic crystalline polyolefin resins and preferably polyethylene, polybutene-1, and polypropylene, or mixtures thereof, may be advantageously used in the practice of the invention, with polypropylene being preferred. Also suitable for the practice of this invention are copolymers of two or more olefins, such as copolymers of ethylene and propylene, which copolymers are preferred.

Methylol phenolic materials which will form grafts with olefin polymers may be used in the practice of the invention. A suitable methylol phenolic material may be prepared by condensation of an unsubstituted phenol, $C_1$–$C_{10}$ alkyl-p-substituted phenol or halogen substituted phenol with an aldehyde, preferably formaldehyde, in an alkaline medium, or by condensation of phenol dialcohols. Methylol phenolic material includes polymeric phenols containing up to 10 benzene rings, but preferred materials contain no more than three benzene rings. Especially preferred are methylol phenolic materials derived from dimethylol phenol substituted with $C_5$–$C_{10}$ alkyl groups, preferably tertiary alkyl groups, in the para position. Examples of satisfactory dimethylol phenolic materials are described in U.S. Pat. Nos. 2,972,600; 3,093,613; 3,287,440; 3,709,840; and 3,211,804, Column 5, lines 3–67, the disclosures of which are incorporated herein by reference. Halogenated (for example, brominated) methylol phenolic materials are also suitable. These halogenated materials, at elevated temperatures in the presence of metal oxide such as zinc oxide, can form Lewis acid activators in situ. Suitable methylol phenolic materials are commercially available.

Generally, any activator which promotes the graft formation between olefin polymer and methylol phenolic material is suitable for the practice of the invention. Preferred activators are Lewis acids, which include the acid-acting metal halides such as boron trifloride, stannous chloride, zinc chloride, titanium tri- or tetrachloride, aluminum chloride, ferric chloride, ferric bromide, zinc bromide, aluminum bromide, or complexes thereof.

In useful composites of the invention, cellulose fibers are incorporated into a matrix containing phenolic modified crystalline olefin polymer which is modified by the action of as little as 0.01 weight percent of methylol phenolic material. Preferred modified polymers of the invention contain between 0.1 and 20 weight percent of methylol phenolic material.

The composites of the invention also contain a bonding agent, present in an amount of at least 0.1 part by weight per 100 parts by weight of the total matrix. Preferably, the composition will contain from about 0.5 to about 10 parts by weight of the bonding agent, per 100 parts of matrix, although lesser amounts, down to 0.1 part by weight per 100 parts by weight of matrix can be effective, depending on the nature of the bonding agent and the ratio of amounts of fibers and matrix. More than 10 parts by weight of bonding agent per 100 parts of the matrix is usually not needed, although excess amounts can be employed if desired.

The bonding agents which are effective in the composites of the invention include, broadly, those agents which have been found to be effective in enhancing adhesion with cellulosic materials, for example, isocyanate-containing bonding agents. These agents include diisocyanates, such as methylene-bis-phenylisocyanate, polysiocyanates, such as tri(isocyanophenyl)methane, and polymeric polyisocyanates, such as polymethylene polyphenylisocyanate (PAPI). Blocked isocyanate compounds are also useful, wherein the reactive isocyanate group is protected by a blocking substituent which in turn is subsequently removed to allow the isocyanate group to react with the cellulosic fibers and form a bond with the matrix material.

Phenol-aldehyde resins are also effective bonding agents in the composites of the invention. Among these materials are phenol-formaldehyde resins and resorcinol-formaldehyde resins. Resol resins, condensed from a phenol and an aldehyde under alkaline conditions, are particularly effective.

Amino-phenol resins are also useful as bonding agents, and include, for example, melamine-formaldehyde resins.

Other known textile-to-rubber bonding systems can be included in the matrix as well. For example, a resorcinol resin can be incorporated in the matrix, together with a methylene donor. Another system, described by Morita U.S. Pat. No. 3,644,268, uses an alkylene-resorcinol polymer together with hexamethylene tetramine as a methylene donor.

Generally, when isocyanate bonding systems are used, an amount of from 0.1 to 2.5 parts by weight in 100 parts by weight of the matrix is sufficient to optimize adhesion of the fiber to the matrix. When phenolaldehyde or amine phenol resins are employed, a greater amount of bonding agent is normally used, such as from about 3 to about 10 parts by weight, based on 100 parts by weight of the matrix.

In addition to the modified crystalline poly(alpha olefin) polymers and the bonding agents described above, the matrix can contain other materials such as other polymers, fillers, reinforcing pigments and plasticizers.

Among the other polymers which can be included in the matrix are unmodified poly(alpha-olefins), such as polyethylene, polypropylene, polybutylene, and copolymers such as ethylene propylene copolymers. These poly(alpha-olefins) can be amorphous as well as crystalline. Hydrocarbon rubbers can also be present, such as natural rubber, styrene-butadiene copolymer rubber, polychloroprene, polybutadiene, butadieneacrylonitrile rubber, synthetic polyisoprene, butyl rubber and EPDM rubber. The hydrocarbon rubbers can optionally be vulcanized, either partially or completely. Of particular interest is inclusion of fine particle size (less than 50 micrometers average) cured EPDM rubber. These other polymers can be present in the matrix in amounts of from 1 to 95 parts by weight, in the case of crystalline polyolefins, and in amounts of from 1 to 60 parts by weight in the case of hydrocarbon rubbers, in each case per 100 parts by weight of the matrix. Mixtures of two or more of these polymers can be used; among them are polyolefin EPDM rubber blends as shown in U.S. Pat. No. 4,130,535.

Fillers which can be included in the matrix composition include the fillers ordinarily used in rubber and plastic formulations, such as calcium carbonate, talc, clay, feldspar and the like. Reinforcing pigments, such as carbon black and silica, can also be employed. The use of fillers or reinforcing pigments, and the amounts used will be dictated by product performance and cost requirements.

Plasticizers can be included in the matrix composition if the matrix composition comprises a rubbery polymer, provided that they are compatible with the particular rubbery polymer used. Plasticizers can be dioctylphthalate, mineral oils, rubber processing oils or factices. Again, the amounts of plasticizers and their types will depend on the desired properties of the finished composite.

Preferred composites of the invention are free of acidic materials capable of promoting the hydrolysis of cellulose, or, in the alternative, contain materials which neutralize acids. Composites which are subjected to elevated temperatures, either in service or in the processing steps of manufacture, are susceptible to the degenerating effects of hydrolysis of the cellulose fibers. Thus, in the case of those composites which must withstand heat, it is preferred that they either contain no acidic materials, or that they contain acid acceptors. Acidic materials which could accelerate hydrolysis of cellulose include inorganic or organic acids, acid salts, and materials which form acids on heating or aging of the composites. Alternatively, acid-accepting materials can be incorporated in the matrix. Examples of such materials are calcium oxide, calcium carbonate and magnesium oxide. Normally, the amount of acid-acceptor used will be at least sufficient to neutralize the Lewis acid activator, although greater amounts can be employed for safety.

The treated fibers of the invention are designed to be used in preparing composites of fiber and polymer, either the composites of the instant invention or composites which are outside the scope of this invention. By virtue of their pretreatment, the incorporation of these fibers into rubber or plastic polymers is facilitated, and the properties of the composites into which they are incorporated are improved and enhanced.

As broadly stated above, the treated fibers of the invention are cellulose fibers with a coating comprising a modified crystalline polymer disclosed above. The amount of the coating which is present in the treated fibers is no more than 85, preferably no more than 50 parts by weight of coating per 100 parts of cellulose fibers. The minimum amount of coating present is the least amount which will reduce fiber-to-fiber interaction, and will vary according to the selection of fiber and coating. Normally, at least five parts by weight of coating are needed, and preferably, from 10 to 30 parts are used, per 100 parts of fibers by weight.

The cellulose fibers have an average aspect ratio of at least five, and preferably from 20 to 200. When the fibers are used in a relatively soft matrix material, the average aspect ratio is preferably from 50 to 200, more preferably from 75 to 200. As with the composites described above, the fibers are preferably unregenerated cellulose, more preferably wood pulp, and most preferably hardwood pulp. The contained polymer is preferably modified crystalline polypropylene, and the polymer is preferably free of acidic materials capable of promoting the hydrolysis of cellulose.

The composites or treated fibers may be prepared by mixing, preferably above the melting point or softening point of the polymers, by using conventional masticating equipment, for example, rubber mills, Brabender Mixers, Banbury Mixers, or twin screw continuous mixer extruders. Mixing times necessary to obtain a homogeneous mixture are satisfactory.

The composites of the invention are useful for making a variety of molded, extruded, or calendered articles. They are particularly useful in making articles by extrusion, injection molding, and transfer molding techniques. The properties of the composites depend upon the composition of the matrix and the relative proportions of fibers and matrix, with a wide range of properties available simply by varying the proportions of the fiber and matrix.

The stress-strain properties of the composites are determined in accordance with ASTM test procedures. Tests are carried out using a Microdumbbell tensile test specimen (ASTM D1708-66) having a test length of 0.876 inches (2.23 cm). An Instron tensile tester was used to pull the specimens apart during the test for tensile strength and ultimate elongation. The tester is designed to measure changes in jaw separation in inches. Though the initial jaw separation was adjusted to the ASTM procedure, to 0.90 inches (2.29 cm.) and the specimen length and jaw separation are not 1.00 inches (2.54 cm.), the elongation at break was read as the jaw separation increase in inches. The percent ultimate elongation or elongation at break was calculated by multiplying the change in jaw separation required to break the specimen (measured in inches) by 100. It is true that the original unstrained sample length was 0.876 inches (not 1.00 inches) and one might expect that the change (in inches) in jaw separation should be divided by 0.876 inches as well as being multiplied by 100. However, it is also true that some flow of the specimen occurs in the jaws, which flow, in effect, somewhat increases the initial or unstrained length. Since the effective length change due to flow of the specimen in the jaws is difficult to measure in each case, and since the effect of this is in the opposite direction of not dividing by 0.876, it was found expedient to estimate the percent ultimate elongation or elongation at break, merely by multiplying the jaw separation to break (measured in inches) by 100. The actual value may deviate from this somewhat, however, the method presented herewith is incorporated into the definition for percent elongation used herein. Test specimens are pulled at 2.5 cm. per minute.

As mentioned previously, the fibers can be present in the composites of the invention in an unoriented, or random fashion. Alternatively, the fibers can be oriented, to a greater or lesser degree, so that their axes are predominantly in a particular direction. In general, passing a fluid mixture of fibers and matrix through a constricted flow zone will cause some degree of orientation of the fibers in the direction of flow. For example, extrusion or passage of molten material through the nip of a rubber mill will tend to turn at least some of the fibers into the direction of flow. Repeated passages of molten composition through a mill can result in a rather high percentage of the fibers oriented in the direction of flow. Other types of orientation can result from extrusion of the composites of the invention, as shown in U.S. Pat. No. 4,056,591, wherein a predominantly circumferential orientation of discontinuous fibers can be achieved in an extruded hose by use of special die configurations. Similarly, U.S. Pat. No. 4,057,610 shows the production of extruded hose in which the fibers are radially oriented in the matrix.

By orienting the fibers in objects formed from the composites of the invention, anisotropic properties can be achieved in the objects, whereby the strength and stiffness in the direction of predominant orientation is enhanced. For example, in pipe or hose containing fibers having a predominantly circumferential orientation, the burst strength is considerably greater than if the fibers were otherwise oriented.

DESCRIPTION OF THE PREFERRED EMBODIMENTS

The modified crystalline polyolefins of the invention are prepared by masticating the components in a Brabender mixer at the oil bath or stock temperatures and mixing speeds indicated below. All parts are by weight, and the total charge is generally adjusted to about 55 to 65 ml.

EXAMPLE I

To prepare crystalline polypropylene having methylol phenolic groups grafted thereto, 100 parts of polypropylene (Profax ® 6723, sold by Hercules, Inc.) are charged to the mixer and masticated at 80 rpm with an oil bath temperature of about 180° C. After the polypropylene is molten, 2 parts of dimethylol-p-octylphenol (sold by Schenectady Chemicals, Inc., under the designation SP-1045) are added and mixing is continued for 2 minutes. Activator, 0.4 parts of stannous chloride dihydrate, is then added and mixed for 3 more minutes. Lastly, 0.07 parts of magnesium oxide is added (to neutralize any free acid) and the batch is mixed for one additional minute. During the mixing, the stock temperature reaches 185° to 190° C. The mass is then removed.

EXAMPLE II

To prepare crystalline polyethylene having methylol phenolic groups grafted thereto, 100 parts of high density polyethylene (Marlex ® EHM 6006, sold by Phillips Chemical Co.) are charged to the mixer and masticated at 80 rpm at about 185°-190° C. Four parts of dimethylol-p-octylphenol are added and mixing is continued for one minute. Activator, 0.8 parts of $SnCl_2.2H_2O$, is then added and mixed for 3 additional minutes. Magnesium oxide, 0.32 parts, is added and mixed for one minute. The product is then removed.

In a subsequent mixing operation, the modified crystalline polyolefins produced as described above are mixed with varying amounts of cellulose fibers to produce composites in which the fibers are oriented, and by subsequent molding operations, useful objects are produced.

EXAMPLE III

It is sometimes desirable to combine the steps of modifying the crystalline polyolefins and incorporating the fibers into a single mixing operation. To illustrate this technique, fibers were mixed with crystalline polypropylene (Profax 6723), both modified and unmodified. To evaluate the contribution of a bonding agent, a small amount of polymethylene polyphenyl isocyanate (PAPI) was also used in both the modified and unmodified samples. Forty-eight grams of Profax 6723 were charged to the Brabender mixer with the oil bath temperature at 180° C., and mixed at 80 rpm until the polypropylene melted. Twelve grams of dry Pinnacle ® hardwood pulp (sold by Westvaco Corp., and containing added water) were then added and mixed for eight minutes until dispersed. During this time, small amounts of water were added to aid dispersion. After the last water evaporated, the temperature of the batch reached about 190° C. The mixture was removed, passed repeatedly in the molten state, through a roll mill to orient the fibers, and compression molded (with minimum flow) at 210° C. The molding was then removed and cooled prior to testing, and identified as sample A. Another mixture was produced in the same manner, except that 1.44 grams of PAPI were added after the polypropylene and fibers had mixed for six minutes, and the combination was mixed for two additional minutes, then removed, milled, molded and cooled as before, and identified as sample B. Finally, a third sample was prepared by mixing 48 grams of molten polypropylene with 0.96 gram of SP-1056 (dimethylol-p-octylphenol, brominated 2-10%, Schenectady Chemicals, Inc.) for two minutes, adding 0.25 gram zinc oxide and mixing one minute, then adding the wood pulp and mixing as above, five minutes, then adding 1.44 grams PAPI and mixing for two minutes, and adding 0.25 gram MgO and mixing for two minutes more. The third sample was removed, milled, molded and cooled, and identified as sample C. In all three samples, the polymer-fiber ratio was 80 parts polymer to 20 parts fiber, by weight.

Physical properties (in the predominant fiber direction) were run on the three samples, with the results shown in Table I, following.

TABLE I

| Properties | A | B | C |
|---|---|---|---|
| Ultimate Tensile Strength, MPa | 28.0 | 24.7 | 37.9 |
| Modulus, MPa | 854 | 799 | 972 |
| Ultimate Elongation, % | 17 | 19 | 17 |

The results shown in Table I indicate that the use of the modified crystalline polypropylene (sample C) gave a 35% improvement in ultimate tensile strength and a 14% improvement in modulus as compared with the control (sample A). The PAPI bonding agent by itself did not appear to produce any improvement at all, sample B giving poorer results than the control.

EXAMPLE IV

A fiber masterbatch was prepared by charging 1106 grams of Pinnacle pulp (containing ambient moisture; 1040 grams dry pulp) and 260 grams of A-FAX ™ 900D amorphous polypropylene (sold by Hercules, Inc.) into a Banbury mixer. The mixture was masticated 12 minutes at low speed with cooling water on to control the temperature below 120° C. The batch was then discharged and cooled for later use. This masterbatch had a polymer-to-fiber ratio of 20 polymer/80 fiber, by weight.

Composites of fibers and matrix were then prepared using the masterbatch described above for the fiber source. Molten polypropylene (Profax 6723) was mixed in the Brabender mixer with varying levels of SP-1056 for one minute. Then zinc oxide was added, followed by two minutes of mixing. The fiber masterbatch was then charged, and dispersed with 2–3 minutes of mixing. The PAPI and MgO were charged at one minute intervals, and the composite was finally mixed for two minutes before discharge and cooling. The Brabender oil bath was maintained at 180° C. and the mixer speed was 80 rpm throughout.

Levels of SP-1056, zinc oxide, MgO and PAPI were varied as shown in Table II, following, with all amounts in grams. Test results are shown for the samples after extrusion to orient the fibers.

The matrix-to-fiber ratio range for all samples was calculated to be from 70 matrix/30 fiber to 71.5 matrix/28.5 fiber by weight.

The test results as shown in Table II indicate that improved physical properties result as the level of SP-1056 is increased, up to about 0.15 or 0.30 grams, and that higher levels of the modifying material do not appear to give further improvement. Sample 7 shows that when the bonding agent is omitted, much poorer physical properties result. In Table II, the parts by weight are expressed as grams per Brabender mixer batch.

TABLE II

| Sample | 0 | 1 | 2 | 3 | 4 | 5 | 6 | 7 | 8 | 9 | 10 |
|---|---|---|---|---|---|---|---|---|---|---|---|
| Fiber Masterbatch | 22.5 | 22.5 | 22.5 | 22.5 | 22.5 | 22.5 | 22.5 | 22.5 | 22.5 | 22.5 | 22.5 |
| Polypropylene | 37.5 | 37.5 | 37.5 | 37.5 | 37.5 | 37.5 | 37.5 | 37.5 | 37.5 | 37.5 | 37.5 |
| SP-1056 | — | — | .019 | .038 | .075 | .15 | .30 | .30 | .60 | 1.20 | 1.20 |
| ZnO | — | — | .019 | .038 | .075 | .15 | .30 | .30 | .60 | 1.20 | 0.30 |
| PAPI | — | 0.75 | 0.75 | 0.75 | 0.75 | 0.75 | 0.75 | — | 0.75 | 0.75 | 0.75 |
| MgO | — | — | .002 | .004 | .08 | .015 | .03 | .03 | .06 | .12 | .12 |
| Physical Properties | | | | | | | | | | | |
| Ult. Tensile Strength, MPa | 26.7 | 29.2 | 31.3 | 32.6 | 37.2 | 41.7 | 44.6 | 30.1 | 42.5 | 41.7 | 40.8 |
| Young's Modulus, MPa | 966 | 973 | 999 | 1069 | 1048 | 1075 | 1068 | 988 | 1000 | 1068 | 1088 |
| Ult. Elongation, % | 10 | 7 | 7 | 6 | 6 | 8 | 8 | 6 | 10 | 10 | 7 |
| Hardness, Shore D | 74 | 75 | 76 | 75 | 77 | 77 | 75 | 73 | 77 | 77 | 76 |

EXAMPLE V

Two fiber masterbatches were prepared as follows: a modified crystalline polypropylene sample was first prepared by charging 100 grams of Profax 6723 and 1.5 grams of SP-1056 to the Brabender mixer, with oil bath temperature at 180° C. and rotor speed at 80 rpm. When the batch temperature reached 190° C., 1.5 grams of zinc oxide were added and mixing was continued for three more minutes.

By using the modified crystalline polypropylene prepared above, a fiber masterbatch was made by charging 10 grams of the modified crystalline polypropylene to the Brabender mixer, then adding 40 grams (dry) of wood pulp dampened with water and ten grams of xylene. Mixing proceeded until the sample reached 145° C., when ten more grams of xylene and an equal amount of water were added. The mixture was again masticated until its temperature reached 145° C., when 10 more grams of xylene were added, and mixing continued until the temperature reached 180° C., with rotor speeds varying from 50 to 80 rpm. After dispersing the fibers, the fiber concentrate was removed. Twenty-five grams of the fiber concentrate was melt mixed with 40 grams of the modified polypropylene, then 0.8 gram of PAPI was added, and mixing continued for 1–2 minutes. Magnesium oxide was charged (0.2 gram) and mixed in for one more minute. A sheet was formed and oriented on the mill using a 70 mil (1.8 mm) nip. Sheets were molded in a press at 210° C. and cooled under pressure.

A control sample was prepared from a sample of unmodified crystalline polypropylene (in both the concentrate and the composition) and cellulose fibers in the same manner, except that the SP-1056, zinc oxide, PAPI and magnesium oxide were omitted. In both instances, the concentrate or masterbatch had a polymer/fiber ratio of 20/80 and the final mixture had a matrix/fiber ratio of about 70/30.

Physical tests of the two samples showed that the modified crystalline polypropylene gave a composite having an ultimate tensile strength of 63.5 MPa compared with the control at 36.1 MPa, a modulus of 2325 MPa compared with the control at 1598 MPa, and an ultimate elongation of 7% compared with 8% for the control.

Although the invention has been illustrated by typical examples, it is not limited thereto. Changes and modifications of the examples of the invention herein chosen for purposes of disclosure can be made which do not constitute departures from the spirit and scope of the invention.

The embodiments of the invention in which an exclusive property or privilege is claimed are defined as follows:

1. A composite consisting essentially of from 2 to 55 weight percent of discontinuous cellulose fibers, the remaining from 98 to 45 weight percent being a matrix comprising from 2 to 99.9 parts by weight of a crystalline polymer from alpha olefin monomer having 2 to 4 carbon atoms, said polymer having methylol phenolic groups grafted thereto, and at least 0.1 part by weight of a bonding agent per 100 parts of matrix by weight.

2. The composite of claim 1, wherein the methylol phenolic modified polymer is a modified crystalline polymer of propylene.

3. The composite of claim 1, wherein the polymer is a modified crystalline copolymer from ethylene and propylene.

4. The composite of claim 1, wherein the methylol phenolic modified polymer is the product of the reaction of 100 parts by weight of crystalline polymer from propylene with about 0.1 to 20 parts by weight of a methylolphenolic material.

5. The composite of claim 4, wherein the matrix comprises from 0.5 to 10 parts by weight of bonding agent.

6. The composite of claim 1, which is free of acidic materials capable of promoting the hydrolysis of cellulose.

7. The composite of claim 1, wherein the matrix contains acid-accepting materials.

8. The composite of claim 1, wherein the fibers have an average aspect ratio of at least five.

9. The composite of claim 2, wherein the fibers have an average aspect ratio of from 20 to 200.

10. The composite of claim 9, wherein the fibers are unregenerated cellulose.

11. The composite of claim 10, wherein the fibers are wood pulp.

12. The composite of claim 11, wherein the fibers are hardwood pulp.

13. The composite of claim 1, wherein the fibers are pretreated to reduce fiber-to-fiber interaction.

14. The composite of claim 2, wherein the bonding agent is selected from the group consisting of diisocyanates, polyisocyanates, polymeric polyisocyanates, blocked isocyanates, phenol-aldehyde resins and amino-aldehyde resins.

15. The composite of claim 10, wherein the bonding agent is selected from the group consisting of phenol-aldehyde resins, amino-aldehyde resins, diisocyanates, polysiocyanates, polymeric polyisocyanates and blocked isocyanates, wherein the average fiber aspect ratio is from 50 to 200.

16. The composite of claim 1, wherein the matrix comprises from 2 to 95 parts by weight of unmodified poly(alpha olefin).

17. The composite of claim 15, wherein the matrix comprises from 1 to 75 parts by weight of fully cured particulate EPDM rubber.

18. The composite of claim 17, wherein the matrix contains fillers and extender oils, and the average fiber aspect ratio is from 75 to 200.

19. Treated fibers comprising discontinuous cellulose fibers of aspect ratio greater than five and crystalline polymer from alpha olefin monomer having 2 to 4 carbon atoms, said polymer having methylol phenolic groups grafted thereto, and said polymer being present in an amount sufficient to reduce fiber-to-fiber affinity up to about 85 parts by weight per 100 parts of fibers by weight.

20. Treated fibers of claim 19, wherein the fibers have an average aspect ratio of at least five.

21. Treated fibers of claim 19, wherein the fibers have an average aspect ratio of from 20 to 200.

22. Treated fibers of claim 19, wherein the fibers are unregenerated cellulose.

23. Treated fibers of claim 19, wherein the fibers are wood pulp.

24. Treated fibers of claim 19, wherein the fibers are hardwood pulp.

25. Treated fibers of claim 19, wherein the crystalline polymer comprises modified crystalline polypropylene.

26. Treated fibers of claim 19, which is free of acidic materials capable of promoting the hydrolysis of cellulose.

* * * * *